(12) United States Patent
Chen (10) Patent No.: US 12,046,978 B2
(45) Date of Patent: Jul. 23, 2024

(54) ELECTRIC GENERATOR PROTECTIVE COVER

(71) Applicant: Ningbo ZhongYuan Machinery Tech. Co., Ltd., Yunlong Town (CN)

(72) Inventor: Haiquan Chen, Yunlong Town (CN)

(73) Assignee: Ningbo Zhongyuan Machinery Tech. Co., Ltd., Yunlong Town (CN)

( * ) Notice: Subject to any disclaimer, the term of this patent is extended or adjusted under 35 U.S.C. 154(b) by 214 days.

(21) Appl. No.: 17/805,768

(22) Filed: Jun. 7, 2022

(65) Prior Publication Data

US 2023/0010233 A1 Jan. 12, 2023

(30) Foreign Application Priority Data

Jul. 10, 2021 (CN) .......................... 202121563403.9

(51) Int. Cl.
*H02K 5/04* (2006.01)
(52) U.S. Cl.
CPC ...................................... *H02K 5/04* (2013.01)
(58) Field of Classification Search
CPC . H02K 5/04; H02K 5/10; H02K 5/225; F02B 2063/045; F02B 63/044; E04H 1/1238
USPC ......... 312/3–6; 150/157, 154; 361/810, 816, 361/824; 290/1 A; 135/90, 96, 124–126, 135/120.3, 135, 117, 119, 120.1, 161; 52/3
See application file for complete search history.

(56) References Cited

U.S. PATENT DOCUMENTS

| | | | | | |
|---|---|---|---|---|---|
| 4,220,880 | A | * | 9/1980 | Woodard | H02K 5/04 310/91 |
| 4,389,057 | A | * | 6/1983 | Richard, Jr. | A61G 5/10 297/184.12 |
| 5,965,949 | A | * | 10/1999 | Fukuda | F02B 63/04 322/1 |
| 6,550,083 | B1 | * | 4/2003 | LaMantia | A47C 29/003 135/96 |
| 8,001,985 | B1 | * | 8/2011 | Conner | E04H 15/56 135/96 |
| 8,997,769 | B2 | * | 4/2015 | Carpenter | E04H 15/02 361/810 |

(Continued)

FOREIGN PATENT DOCUMENTS

| | | | | |
|---|---|---|---|---|
| CN | 110542001 | A | * 12/2019 | ............... H02K 5/24 |
| CN | 216699680 | | * 6/2022 | |
| CN | 216774500 | | * 6/2022 | |

OTHER PUBLICATIONS

CN101260831 English claim and abstract (Year: 2008).*
CN203645451 English claim and abstract (Year: 2014).*
CN216451261 English claim and abstract (Year: 2022).*

*Primary Examiner* — Janet M Wilkens
(74) *Attorney, Agent, or Firm* — Wang Law Firm, Inc.

(57) ABSTRACT

An electric generator protective cover has a protective cloth cover, a cover assembly, and a plurality of fixing feet. The cover assembly includes a central block located in the center of the top and four elastic supporting rods fixed to the central block. The protective cloth cover is jacked up through the central block and the four elastic supporting rods. One end of each fixing foot is connected to an elastic supporting rod, and the other end is mounted on an upper cross bar of an electric generator frame. The electric generator protective cover has the advantages that the protective cloth cover is arranged, which can isolate dirt such as rain, snow, mud, and sand.

3 Claims, 8 Drawing Sheets

(56) References Cited

U.S. PATENT DOCUMENTS

| | | | |
|---|---|---|---|
| 11,621,603 B2* | 4/2023 | Wheeler | H02K 5/22 |
| | | | 220/4.01 |
| 2004/0099301 A1* | 5/2004 | Zhang | E04H 15/28 |
| | | | 5/97 |
| 2013/0074421 A1* | 3/2013 | Wood | B62J 7/08 |
| | | | 52/3 |

* cited by examiner

ELECTRIC GENERATOR PROTECTIVE COVER

TECHNICAL FIELD

The present disclosure relates to a protective tool used on an electric generator, in particular, to an electric generator protective cover.

BACKGROUND

Many families will have electric generators for unexpected needs. China's power grid system is perfect, so the proportion of household purchase is not too high. However, the electric generators are commonly used standby products in the areas with low population density and imperfect power systems in North America, northern Europe, Central Asia, etc.

The power systems usually fail in severe weather, such as blizzard, heavy rain, strong wind, earthquakes, etc. In such weather, it is also a headache to use an electric generator outdoors. Rain, snow, mud, and sand easily penetrate into various joint gaps of the electric generator, which affects later maintenance and cleaning and the service life.

SUMMARY

In view of the disadvantages in the prior art, the present disclosure provides an electric generator protective cover for protecting an electric generator.

The abovementioned technical problems are solved by the following technical solution: an electric generator protective cover includes a protective cloth cover, a cover assembly, and a plurality of fixing feet. The cover assembly includes a central block located in the center of the top and four elastic supporting rods fixed to the central block. The protective cloth cover is jacked up through the central block and the four elastic supporting rods. One end of each fixing foot is connected to an elastic supporting rod, and the other end is mounted on an upper cross bar of an electric generator frame.

The fixing foot is a hollow pipe bent into an upper pipe rod, a middle pipe rod, and a lower pipe rod. The upper pipe rod is fixed to the upper cross bar through an 8-shaped pipe clamp. The middle pipe rod is parallel to a vertical cross bar of the electric generator frame. The lower pipe rod extends outwards in a direction of a connecting line between two vertical cross bars. A pin hole in a horizontal phase is formed in an end of the lower pipe rod. A distance adjusting pin is built in the lower pipe rod. A blind pin hole and adjusting holes are formed in the distance adjusting pin. The pin hole is fixed to an adjusting hole through a positioning pin. A lower end of the elastic supporting rod is inserted into the blind pin hole.

Four side holes and a center step hole are formed in the central block. The upper ends of the elastic supporting rods are inserted into the side holes. A movable cap is arranged on the center step hole. A spring is arranged on a central rod of the movable cap in a sleeving manner. The protective cloth cover is jacked up through the movable cap.

The protective cloth cover includes an outer cover and a plurality of top fin covers. A plurality of heat dissipation holes are formed in the outer cover located below the top fin covers. A slit is formed in a lower hem of the outer cover. A primary-secondary belt is arranged on an inner side of the slit. An opening is formed in a side surface of the outer cover. A zipper is arranged at an edge of the opening. An elastic band is arranged on the inner side of the lower hem of the outer cover. The elastic band is fixed to the lower pipe rod.

Compared with the prior art, the present disclosure has the following beneficial effects: 1, the protective cloth cover is arranged, which can isolate dirt such as rain, snow; mud, and sand, and facilitates the use in severe weather: the elastic supporting rods and the movable cap are built in the protective cloth cover, which can achieve an effect of supporting the protective cloth cover; 2, the electric generator protective cover is convenient to mount and is fixed to the upper cross bar of the electric generator frame as a whole, and the lower ends of the elastic supporting rods are inserted into the blind pin holes, which is convenient to detach; and 3, the heat dissipation holes, the slit, and the opening are designed in the protective cloth cover, which facilitates heat dissipation, observation, and mounting.

DETAILED DESCRIPTION OF THE EMBODIMENTS

The present disclosure will be further described in detail with reference to the accompanying drawings and specific implementation modes. As shown in FIGS. 1 to 8, reference signs in the drawings are as follows: protective cloth cover 01, outer cover 1a, top fin cover 1b, heat dissipation hole 1c, slit 1d, opening 1e, cover assembly 02, fixing foot 03, upper pipe rod 31, middle pipe rod 32, lower pipe rod 33, pin hole 331, central block 04, side hole 41, center step hole 42, elastic supporting rod 05, electric generator frame 06, upper cross bar 61, vertical cross bar 62, 8-shaped pipe clamp 07, distance adjusting pin 08, blind pin hole 81, an adjusting hole 82, positioning pin 09, movable cap 10, spring 11, primary-secondary belt 12, zipper 13, and elastic band 14.

An electric generator protective cover includes a protective cloth cover 01, a cover assembly 02, and four fixing feet 03. The cover assembly includes a central block 04 located in the center of the top and four elastic supporting rods 05 inserted into the central block. The protective cloth cover is jacked up through the central block and the four elastic supporting rods. One end of each fixing foot is connected to an elastic supporting rod, and the other end is mounted on an upper cross bar 61 of an electric generator frame 06.

Figure 1:
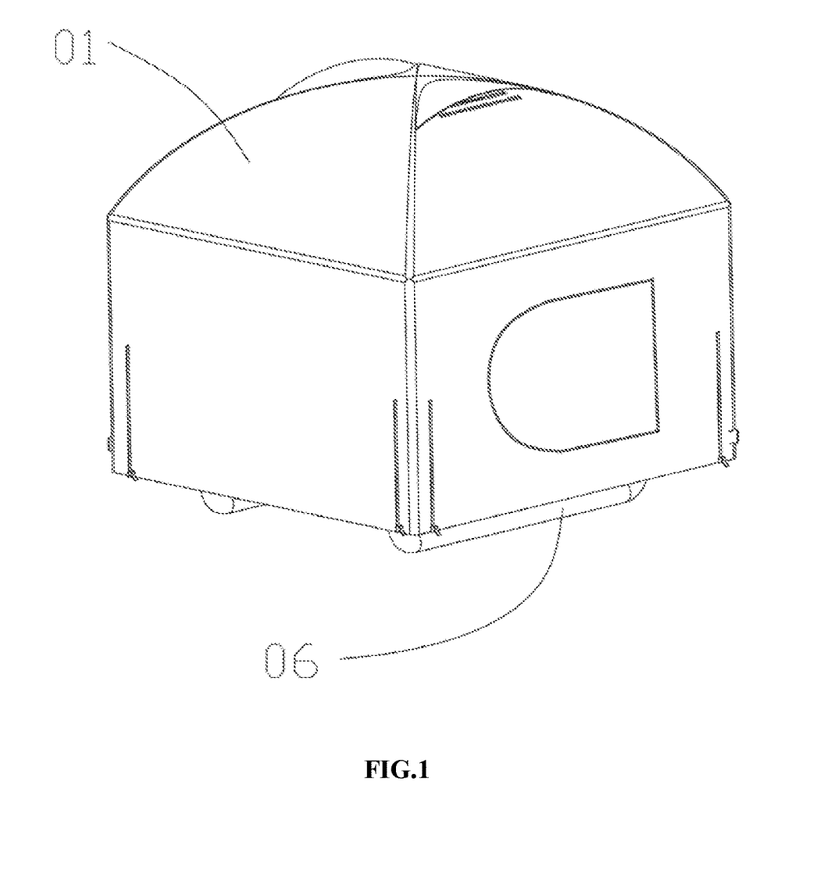
FIG. 1 illustrates a structural diagram of the present disclosure after mounting.
Figure 2:
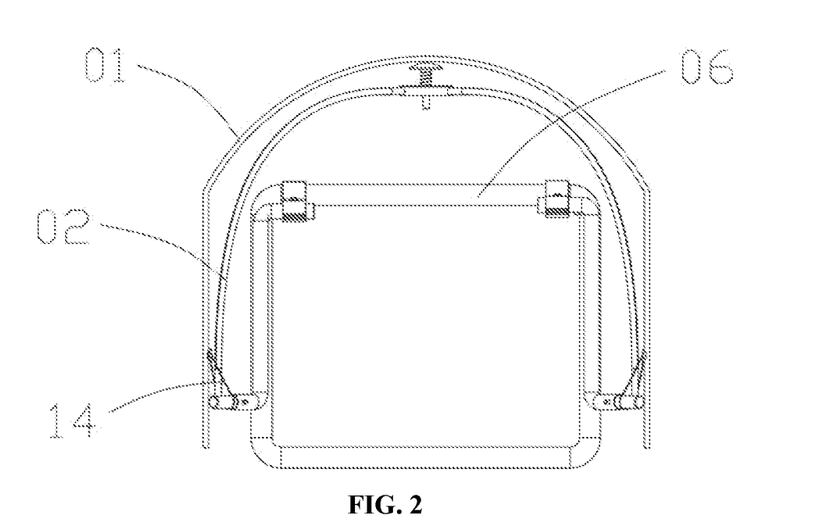
FIG. 2 illustrates a cutaway view of the present disclosure after mounting.
Figure 3:
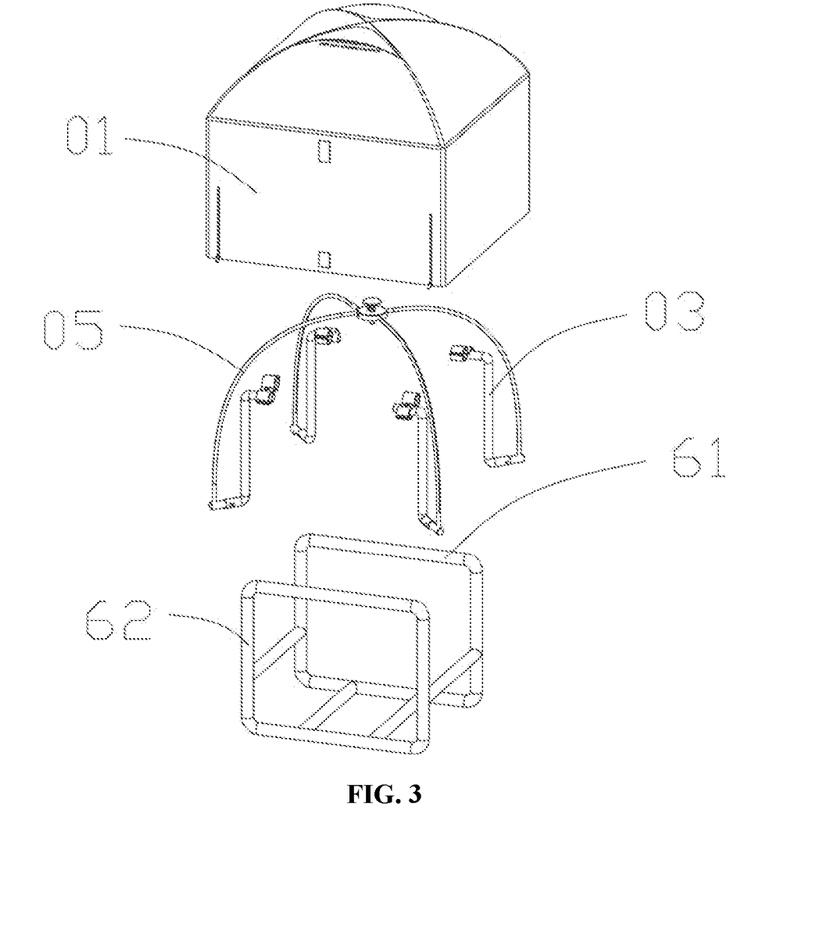
FIG. 3 illustrates an exploded view of the protective cloth cover, cover assembly, and electric generator frame of the present disclosure.
Figure 4:
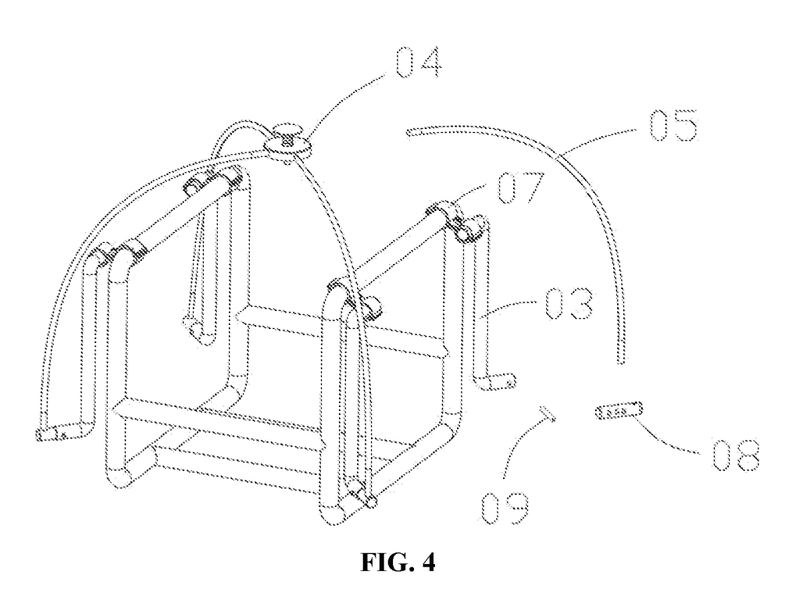
FIG. 4 illustrates an assembly drawing of the cover assembly and electric generator frame of the present disclosure.
Figure 5:
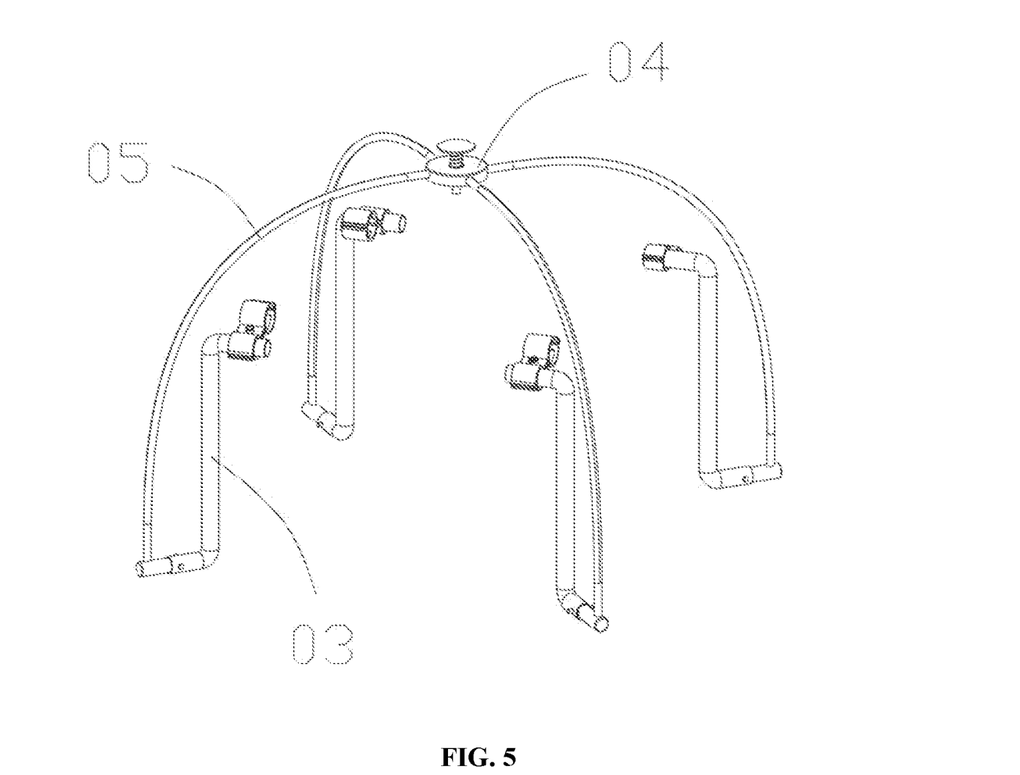
FIG. 5 illustrates an assembly drawing of the cover assembly and the fixing feet of the present disclosure.
Figure 7:
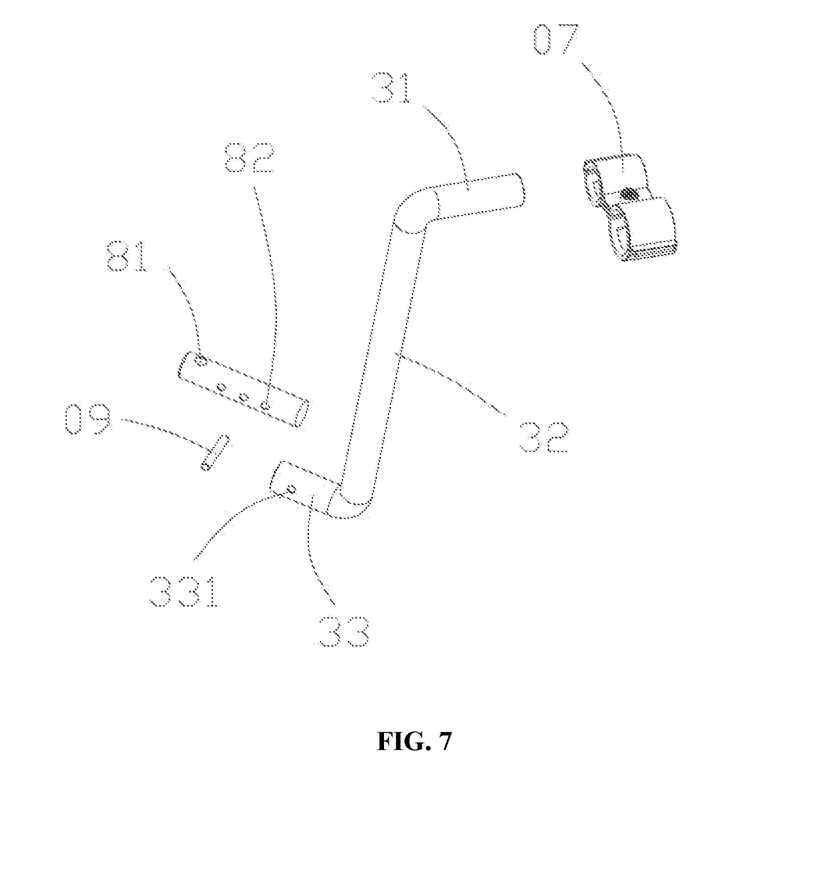
FIG. 7 illustrates an assembly drawing of the fixing feet and fasteners of the present disclosure.

The fixing foot is a hollow pipe bent into an upper pipe rod 31, a middle pipe rod 32, and a lower pipe rod 33, and may be made of an aluminum pipe, a stainless steel pipe, or a plastic pipe. The upper pipe rod is fixed to the upper cross bar through an 8-shaped pipe clamp 07. The middle pipe rod is parallel to a vertical cross bar 62 of the electric generator frame. The lower pipe rod extends outwards in a direction of a connecting line between two vertical cross bars, and generally extends outwards at an angle of 45 degrees. A pin hole 331 in a horizontal phase is formed in an end of the lower pipe rod. A distance adjusting pin 08 is built in the lower pipe rod. A blind pin hole 81 and three to four adjusting holes 82 are formed in the distance adjusting pin. The pin hole is fixed to an adjusting hole through a positioning pin 09. A lower end of the elastic supporting rod is inserted into the blind pin hole.

Figure 6:
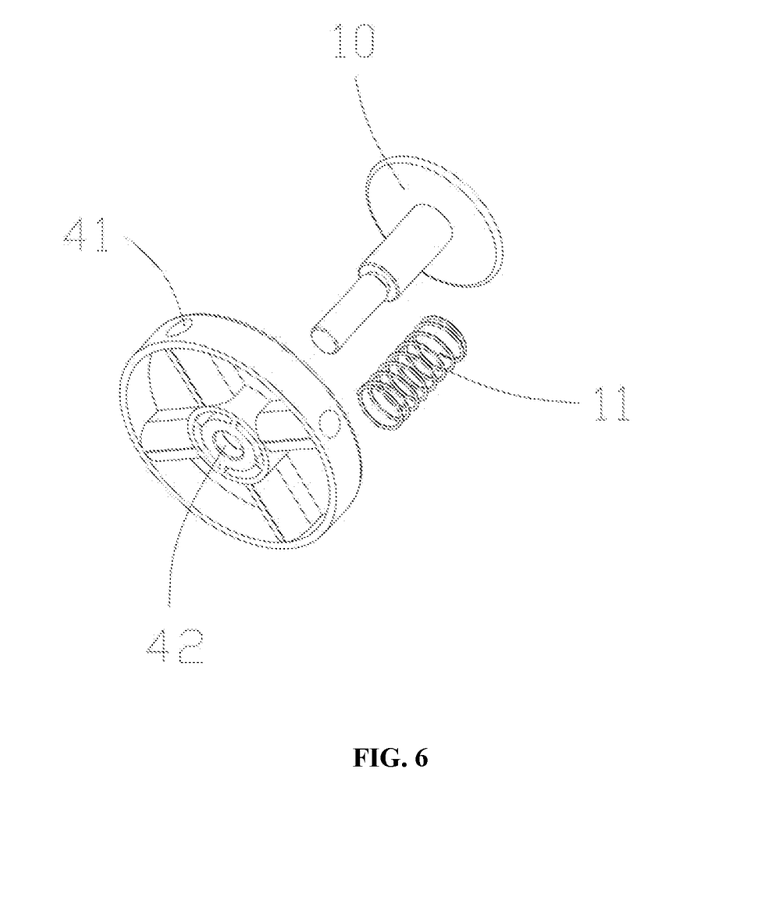
FIG. 6 illustrates an assembly drawing of the central block of the present disclosure.

Four side holes 41 and a center step hole 42 are formed in the central block. The upper ends of the elastic supporting rods are inserted into the side holes. A movable cap 10 is arranged on the center step hole. A spring 11 is arranged on a central rod of the movable cap in a sleeving manner. The protective cloth cover is jacked up through the movable cap, so that the protective cloth cover is jacked straight and full, and will not collapse.

Figure 8:
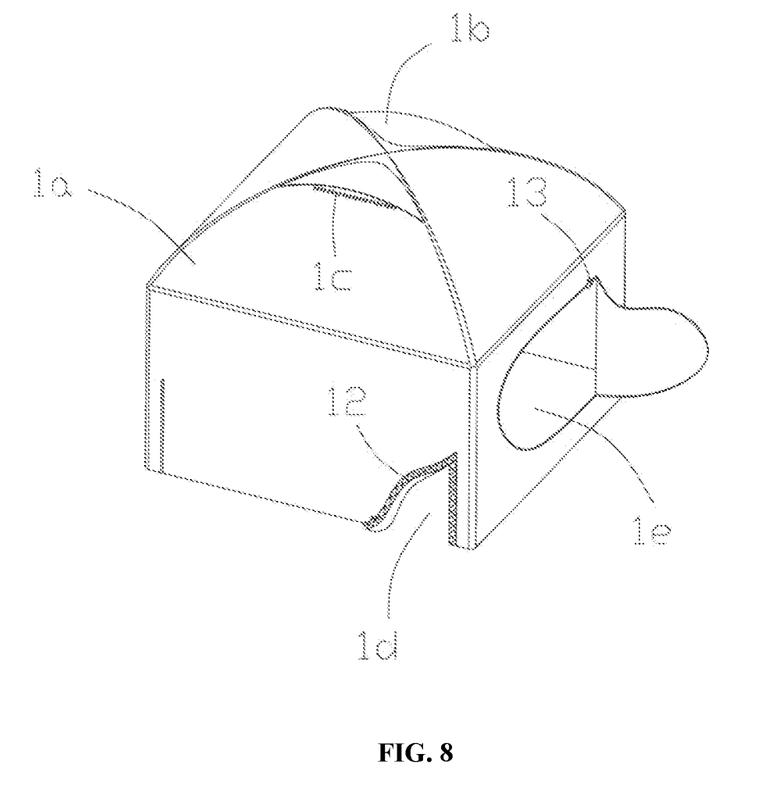
FIG. 8 illustrates an external view of the electric generator protective cover of the present disclosure.

The protective cloth cover includes an outer cover 1a and a pair of top fin covers 1b. A plurality of heat dissipation holes 1c are formed in the outer cover located below the top fin covers. A slit 1d is formed in a lower hem of the outer cover. A primary-secondary belt 12 is arranged on an inner side of the slit. An opening 1e is formed in a side surface of the outer cover. A zipper 13 is arranged at an edge of the opening. The opening may be used for observation or repair. An elastic band 14 is arranged on the inner side of the lower hem of the outer cover. The elastic band is hooked on the lower pipe rod or an elastic supporting rod, or may also be fixed by binding.

During mounting, the fixing feet are fixed to the upper cross bar of the electric generator frame by using 8-shaped pipe clamps, and the orientation of the lower pipe rod is adjusted: then, the upper ends of the elastic supporting rods are inserted into the side holes of the central block, and the lower ends are inserted into blind pin holes of the distance adjusting pins; and finally, the movable cap on which a spring is arranged in a sleeving manner is inserted into the center step hole, and then a frame is erected. Then, the protective cloth cover covers outside.

When the protective cloth cover is mounted, the slit of the lower hem of the outer cover may be opened first, so as to facilitating sleeve.

All simple structural changes based on the present design concept fall within the scope of protection of this application.

What is claimed is:

1. An electric generator protective cover, comprising
a protective cloth cover (01),
a cover assembly (02),
an electric generator frame (06), and
a plurality of fixing feet (03),
wherein the cover assembly (02) comprises a central block (04) located in a center of a top of the cover assembly (02) and four elastic supporting rods (05) fixed to the central block (04); the protective cloth cover (01) is jacked up through the central block (04) and the four elastic supporting rods (05); a first end of each fixing foot (03) is connected to a corresponding elastic supporting rod (05) of the aforementioned four elastic supporting rods (05), and an opposite end of each fixing foot (03) is mounted on one of two upper cross bars (61) of the electric generator frame (06), each fixing foot (03) is a bent hollow pipe comprising an upper pipe rod (31), a middle pipe rod (32), and a lower pipe rod (33); each upper pipe rod (31) is fixed to one of the two upper cross bars (61) by an 8-shaped pipe clamp (07); each middle pipe rod (32) runs parallel to one of a plurality of vertical cross bars (62) of the electric generator frame (06); each lower pipe rod (33) extends radially outwards from the electric generator frame (06); and
a pin hole (331) is horizontally disposed at an end of each lower pipe rod (33), and each lower pipe rod (33) has a corresponding distance adjusting pin (08) sleeved on the lower pipe rod (33), each distance adjusting pin (08) has a blind pin hole (81) and a plurality of adjusting holes (82), such that the pin hole (331) is fixed to one of the plurality of adjusting holes (82) by a positioning pin (09); and a lower end of each elastic supporting rod (05) is inserted into a corresponding blind pin hole (81).

2. The electric generator protective cover according to claim 1, wherein four side holes (41) and a center step hole (42) are formed in the central block; the upper ends of the elastic supporting rods are inserted into the side holes; a movable cap (10) is arranged on the center step hole; a spring (11) is arranged on a central rod of the movable cap in a sleeving manner; and the protective cloth cover is jacked up through the movable cap.

3. The electric generator protective cover according to claim 2, wherein the protective cloth cover comprises an outer cover (1a) and a plurality of top fin covers (1b); a plurality of heat dissipation holes (1c) are formed in the outer cover located below the top fin covers; a slit (1d) is formed in a lower hem of the outer cover; a primary-secondary belt (12) is arranged on an inner side of the slit; an opening (1e) is formed in a side surface of the outer cover; a zipper (13) is arranged at an edge of the opening; an elastic band (14) is arranged on the inner side of the lower hem of the outer cover; and the elastic band is fixed to the lower pipe rod.

\* \* \* \* \*